United States Patent
Crooks et al.

(10) Patent No.: US 10,072,968 B2
(45) Date of Patent: Sep. 11, 2018

(54) VIBRATION SPECTRUM ADJUSTMENT FOR SCALES

(71) Applicant: NCR Corporation, Duluth, GA (US)

(72) Inventors: John Crooks, Duluth, GA (US); Jorge Eduardo Pérez-Jácome, Lawrenceville, GA (US)

(73) Assignee: NCR Corporation, Atlanta, GA (US)

( * ) Notice: Subject to any disclaimer, the term of this patent is extended or adjusted under 35 U.S.C. 154(b) by 453 days.

(21) Appl. No.: 14/714,414

(22) Filed: May 18, 2015

(65) Prior Publication Data

US 2016/0341597 A1    Nov. 24, 2016

(51) Int. Cl.
| | |
|---|---|
| *G01L 7/00* | (2006.01) |
| *G01N 11/00* | (2006.01) |
| *G01H 13/00* | (2006.01) |
| *G01G 23/00* | (2006.01) |
| *G01G 23/06* | (2006.01) |

(52) U.S. Cl.
CPC ............ *G01H 13/00* (2013.01); *G01G 23/00* (2013.01); *G01G 23/06* (2013.01)

(58) Field of Classification Search
CPC ......... G01H 13/00; G01G 23/00; G01G 23/06
See application file for complete search history.

(56) References Cited

U.S. PATENT DOCUMENTS

| | | | |
|---|---|---|---|
| 7,292,947 B1 * | 11/2007 | Tabatabaei | G01R 31/31709 702/191 |
| 2008/0088416 A1 | 4/2008 | Crooks et al. | |
| 2011/0001633 A1 * | 1/2011 | Lam | G01R 29/26 340/853.1 |
| 2012/0162525 A1 * | 6/2012 | Schoner | H04N 19/00909 348/607 |

* cited by examiner

*Primary Examiner* — Toan Le
(74) *Attorney, Agent, or Firm* — Schwegman, Lundberg & Woessner

(57) ABSTRACT

A method includes receiving noise spectral information from a scale, analyzing the noise spectral information via circuitry to identify instances of noise with various magnitudes at multiple frequencies, ending a listening period, and providing the identified instances of noise to be displayed.

18 Claims, 4 Drawing Sheets

VIBRATION SPECTRUM ADJUSTMENT FOR SCALES

BACKGROUND

Vibration caused by takeaway belts, air handlers and other sources of vibration can interfere with a scale's performance. Such vibrations can make response sluggish, reduce accuracy, and increase the number of service calls.

SUMMARY

A method includes receiving noise spectral information from a scale, analyzing the noise spectral information via circuitry to identify instances of noise with various magnitudes at multiple frequencies, ending a listening period, and providing the identified instances of noise to be displayed.

A device includes a display, a communication connection to couple to a scale and receive scale spectrum information, a memory containing programming and coupled to the communication connection, circuitry coupled to the communication connection to receive the scale spectrum information and process the spectrum information to create a graph representative of the scale spectrum information, and a display coupled to the circuitry to provide a display of the graph.

A further device includes a processor, a display coupled to the processor, a communication module coupled to the processor, and a memory device coupled to the processor and having a program stored thereon for execution by the processor to receive noise spectral information from a scale via the communication module, analyze the noise spectral information to identify instances of noise with various magnitudes at multiple frequencies, end a listening period, and provide the identified instances of noise to be displayed on the display.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media or computer readable storage device such as one or more memory or other type of hardware based storage devices, either local or networked. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Figure 1:
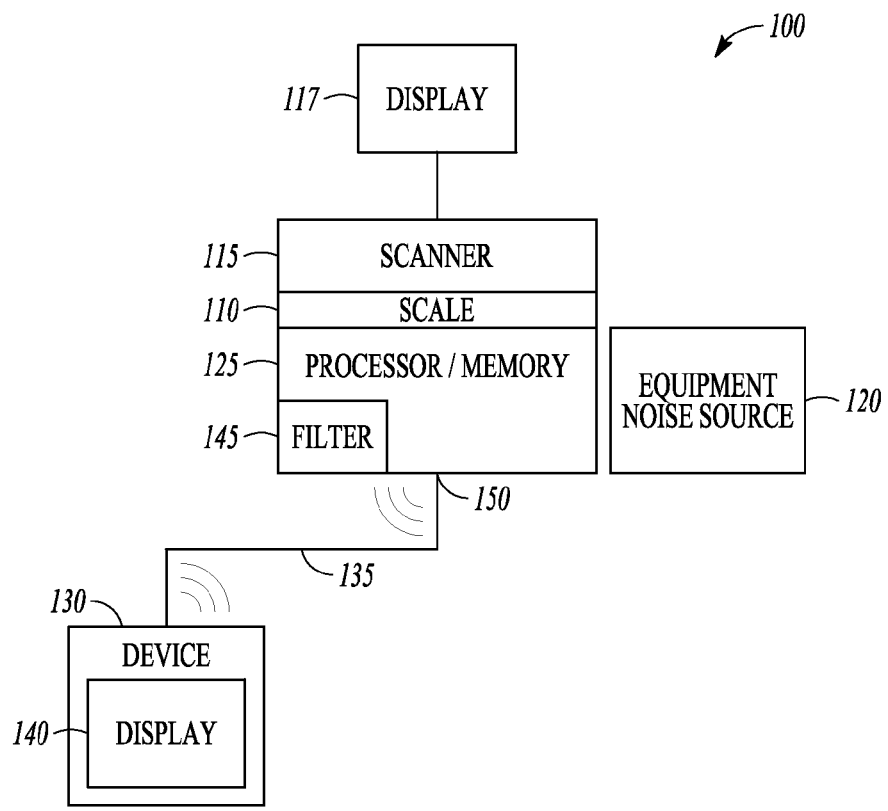
FIG. 1 is a block diagram of a scale with spectral analysis according to an example embodiment.

FIG. 1 is a block diagram of a weighing device 100 that includes a scale 110 used as a spectrum analyzer to measure and aid in compensating the scale 110 for vibration. The scale 110 may include a scanner 115 that may be integrated into a weighing surface of the scale 110 to provide a convenient single location to weigh and scan items such as product being purchased. Scale 110 may also be used in manufacturing lines or in other contexts where items are to be weighed. In some embodiments, the scale 110 may also include a scale display 117 coupled to the scale 110 to display weights, messages, alerts, and other information. The weighing device 100 may be referred to as a scanner or a scale, as a scanner may include a scale in some embodiments. The scale 110 may be installed in an environment where vibrations from other equipment 120 may affect the measurements of the scale by introducing noise.

Spectrum analysis may be performed by circuitry, such as a programmable processor and memory 125, sweeping through a specified frequency range and successively detecting signal power at each of a plurality of relatively narrow frequency bands within the frequency range. Spectrum analysis can be used to create a profile of an active signal source that can be analyzed to identify the type of source producing the signal. In various embodiments, a diagnostic system 130 may be coupled via a communication connection or module that may include suitable software and firmware utilizing a cable 135 or wireless transceivers to receive the measurements from the scale 110 during installation, graphing vibration versus frequency on a display 140 and facilitating adjustment of a frequency-selective scale noise filter 145 by the operator to account for the noise. An operator or technician may couple the diagnostic system to the scale 110 to perform such installation and adjustment.

Performing the measurement and adjustment during installation of the scale 110 may provide a benefit of insuring via the operator, that the scale 110 is not in use by a cashier or customer, and that other equipment 120 such as delivery belts, air vents, doors, and other systems that might cause vibration are in actual use during a listening period.

Figure 2:
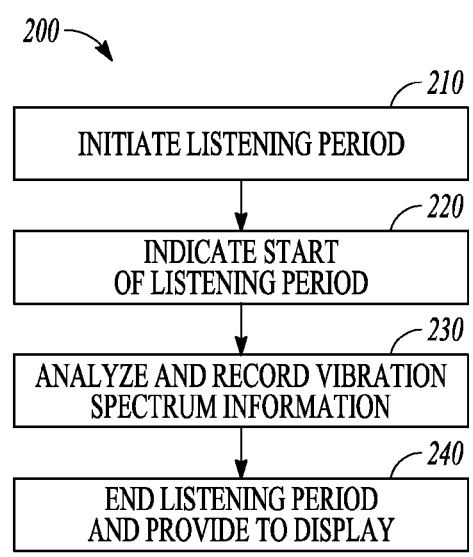
FIG. 2 is a flowchart illustrating a method of measuring a noise spectrum by a scale according to an example embodiment.

A method 200 is illustrated in flowchart form in FIG. 2. In one embodiment, the operator/installer initiates a scale noise listening period 210 using a barcode program sequence, button sequence or other unique event. The scale 110, such as an NCR 7879 scanner which includes a scale, optionally indicates a start and end of the listening period with beeps or other sounds, or by showing messages on a connected scale display at 220.

During the listening period, the scale 110 analyzes and records information at 230 about the vibrational noise amplitude and/or spectrum. The listening period ends at 240, such as after a fixed timeout, tag program sequence, or other event. The recorded information may be made available for display. Optionally, the recorded information may be transmitted to a device for display in real time.

Figure 3:
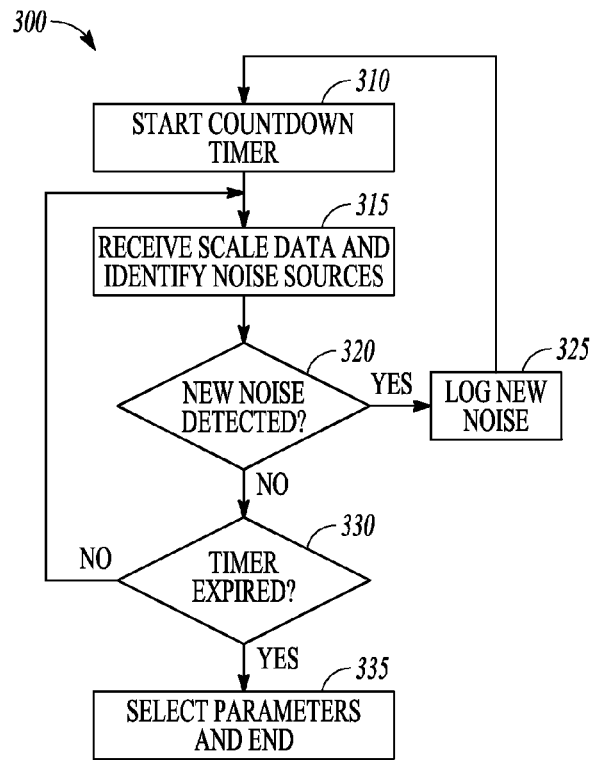
FIG. 3 is a flowchart illustrating a method of measuring a noise spectrum for a limited period of time according to an example embodiment.

In a further option, the scale 110 can end the listening period automatically when the scale no longer sees any new sources of noise in accordance with a method 300 as illustrated in FIG. 3. In one embodiment, at 310 the scale starts a countdown timer, for example, 10 seconds. In some embodiments, the timer may be less than 10 seconds or longer than 10 seconds, such as 15 or 20 seconds. Too long a time may not be practical, and may not improve results significantly. The scale data is received is analyzed at 315, and the scale identifies noise sources based on their frequency spectrum. At 320, if a new noise source is detected, the scale logs the new noise source center frequency at 325 and re-starts the countdown timer at 310. If the noise source is not new and if the timer has not expired at 330, the scale allows the countdown timer to continue, and continues to receive scale data at 315. If the timer has expired as indicated at 330, the process 300 ends at 335.

In some embodiments, at 335, the scale may automatically configure its filter based on the noise data. This may be done by using an algorithm or table lookup in various embodiments.

For example, one second after the countdown timer starts, the scale might identify a scale noise source centered at 2 Hz. The scale logs the 2 Hz noise source and resets the countdown timer. Five seconds later, the scale might identify a noise source centered at 60 Hz. The scale logs the 60 Hz noise source and resets the countdown timer. Two seconds later, the scale might identify the known noise source centered at 2 Hz. The scale does nothing and allows the countdown timer to continue, as the 2 Hz noise source was already identified and logged.

If the countdown timer reaches zero, then the scale ends the listening period. For example, if the scale has not found a new noise source 10 seconds after finding the 60 Hz noise source, then the scale ends the listening period. The scale or operator may then selects optimal frequency selective scale filter parameters based on data gathered during the listening period and lock the filter parameters into its nonvolatile memory 125 at 335 until an installer or maintenance person initiates another listening period. The scale may then speak or display a message each time a new noise source is found. In some embodiments, and installer may turn on an off various known noise sources to correlate measured noise to the noise sources. Such an exercise can help identify excessive noise sources or noise sources that are malfunctioning.

The measured and logged scale noise spectrum may optionally be displayed in real time on a PC, mobile device, or other type of device with a display, for purposes of identifying and mitigating scale noise sources, effectively turning the scale into a spectrum analyzer. A port 150 may be provided on the scale 110 in FIG. 1, such as a USB port to couple the device 130 and display 140 to receive the logged data as it is logged and analyzed. The device 130 may be running TTY console software or custom measurement software, and communicate with the scale via the USB port, RS232 POS port, auxiliary port, Ethernet port, Bluetooth wireless, or other wired or wireless communication capability.

Figure 4:
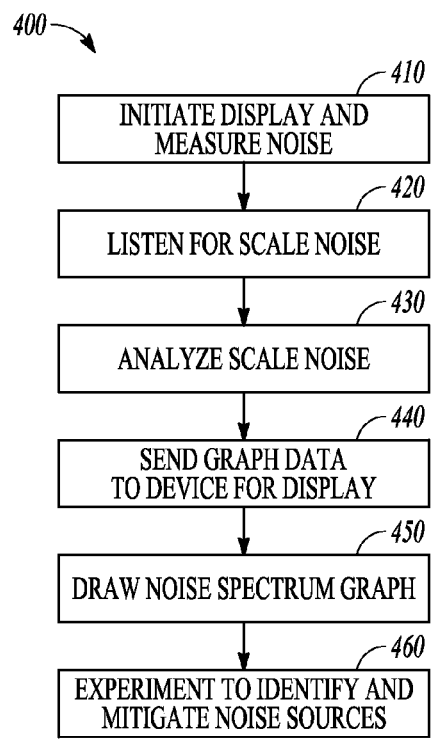
FIG. 4 is flowchart illustrating a method of providing a visual representation of a noise spectrum according to an example embodiment.

The device software may perform a method as illustrated at 400 in FIG. 4. At 410, the scale 115 may be used to scan a special barcode program sequence provided by an operator to initiate a display of the measured noise. The scale 110 starts listening for scale noise at 420 and may use an FFT analysis 430 to measure noise according to frequency. The scale continuously sends a scale noise spectrum graph to the device at 440, along with the scale live weight for reference. In one example, TTY text characters may be used to draw the noise spectrum graph in TTY software running on the device at 450. Other display methods are possible using purpose-build custom measurement software. The Scale may optionally paint a red limit line on the graph or other construct to help identify which peaks on the graph are problems for the scale. The operator may observe the scale noise spectrum graph on the display. If there are scale noise sources visible, then operator can experiment with nearby delivery belts, air vents, doors, and other systems to find and mitigate the source of the noise at 460. Experimentation may include turning devices off and on, adjusting devices, and other creative actions which might help isolate, identify, and mitigate undesired noise sources. Once the scale noise sources are mitigated, the operator can optionally initiate an automatic scale filter listing and adjusting period as described in method 300. The operator may end the scale noise monitoring and display by powering the scale off and then back on again, or by scanning a special tag program sequence.

In some embodiments, a remote operator may also initiate monitoring by using a server coupled to the scale's Ethernet port or otherwise coupled to the scale. The remote operator may then verify the scale is not in use by watching the scale top plate through a built-in camera or cameras. Optionally, in case or problems, a local technician could log processed or unprocessed noise data on a USB flash drive connected to the scale and then email the noise data to remote support personnel for more detailed analysis. The noise data may further include live video from scale cameras to help support personnel understand the environment when the noise data was gathered. Video conferencing via local technician smart phones may also be used to help support personnel understand the environment.

Visual inspection of variations of electromechanical signals may be done in order to study their behavior, analyze special situations, determine extreme or failure conditions, and to use the information in order to tune or improve the design of systems. The oscilloscope and audio spectrum analyzer have been the traditional instruments used for visual analysis of those signals.

The weight in a Scanner-Scale is one of such signals of interest. The general speed requirements of a weight scale are not high compared to speed requirements for sound or video, but fast enough to fall into a category where a plot can yield great advantages compared to inspecting individual data samples (acceptable in such slow signals as weather temperature or pressure).

Barcode scanner-scales (which may be a scale without a scanner) can be present in a wide variety of places. They can be mounted over different materials—metal, wood, plastic, ceramic, fiberglass—and the building structures can also have a great variety—carpet, concrete, wood—that will somehow interfere with the operation of the scale, due to different oscillation patterns, vibration absorption, etc. The scanner-scales units themselves can also have a wide variety of physical responses, depending on the size, material, load-cell mounting, weight plate mass and geometry, electric circuit time-response, etc. Other factors that are also important are the automatic belts of the checkout POS, the typing keyboards used by cashiers, the patterns of the cashiers themselves (how they drop the items on the scale plate, how they remove them, etc.).

In one embodiment, a weight signal plotter for a TTY terminal connected to a scanner-scale is embedded in the scanner-scale firmware itself.

The scale module of the scanner-scale produces a new weight value at a regular conversion rate (i.e. one new value every 30 ms). The scanner-scale can be connected via RS232 to a computer enabled device 130 using a TTY terminal program where a user can send and receive information to perform different tasks.

Using the TTY terminal, the user may access an option to start plotting the weight values in the most natural way for a TTY terminal: For each new weight value, a special character will be presented in a different position in a text line, leaving the rest of the line blank, so that the signal plot will be formed with the apparent connection between the special character in contiguous lines.

The position of the special character will be obtained from a mapping operation from the weight value. The mapping should be such that the minimum value desired by the user to be plotted corresponds to character position 0 and the maximum value desired corresponds to the right-most allowed by the TTY terminal (typically 79). Thus the minimum and maximum desired values for the weight to be plotted should be requested to the user before starting the plotting operation. A proper selection of these values can yield a fairly good resolution for visual inspection. A simple keystroke at the TTY terminal should make the program leave the weight signal plotting mode.

Figure 5:
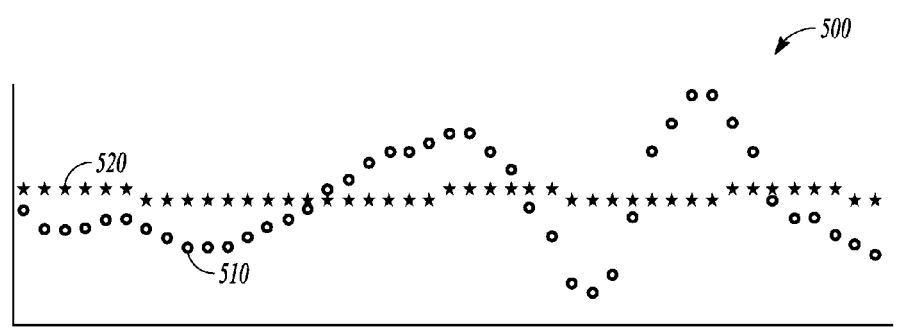
FIG. 5 is graph illustrating an example output with a raw and a filtered weight signal according to an example embodiment.

An example of raw output from the scale is shown in FIG. 5 at 500. The raw output is a weight value and is represented by "O" symbols, in the graph forming a line 510. The filtered output is shown as a line 520 of "*" symbols. A graphical presentation of the variations of the weight signal can be shown on the display.

Figure 6:
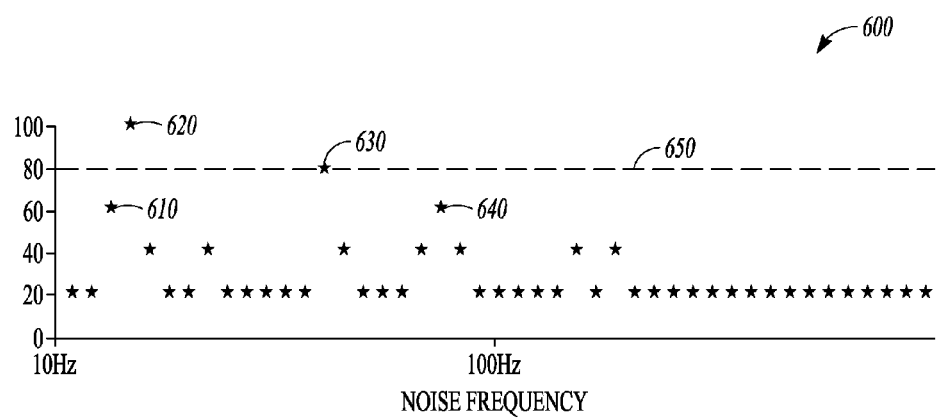
FIG. 6 is a graph illustrating an example spectrum analyzer output according to an example embodiment.

FIG. 6 is a graph illustrating spectrum analysis generally at 600 performed on the raw output. The graph 600 is not necessarily representative of the raw output of 500. In this example, the noise is associated with a live weight of 0.05 Kg. A similar graph may be generated for a representation of noise generated during installation of the scale and used to generate the filter parameters that result in the filtered output 520. Graph 600 shows noise amplitude versus frequency utilizing the "*" symbol. Note that there are several spikes of noise at various frequencies between 10 Hz and 100 Hz such as those indicated by symbols at 610, 620, 630, and 640. At least two of the noise spikes, 620 and 630 exceed a red noise limit line 650, representative of noise spikes of concern.

In various embodiments, the generation of graphs does not require moving the scanner-scale unit from its regular operation place, providing more realistic data. The presented data may be the actual one produced by the scanner-scale. It already includes effects such as sampling rate and quantification of signals. In one embodiment, the functionality can be part of the scanner-scale's own firmware. No other firmware/software component is needed.

Signals produced by different stages of the weight processing algorithms can be presented simultaneously to appreciate the result of the firmware algorithms. This is the case for raw signals vs. filtered-against-vibration signals. Different characters can be used to represent the different signals. Auto-scaling of the signal can be incorporated into the weight plotter: In this modality, the user just starts the scope and the maximum and minimum recent values are saved so that the signal is scaled properly to be presented within the available length of the lines. The value of the actual weight can be presented at the right on each line so the user knows exactly what is being displayed.

Figure 7:
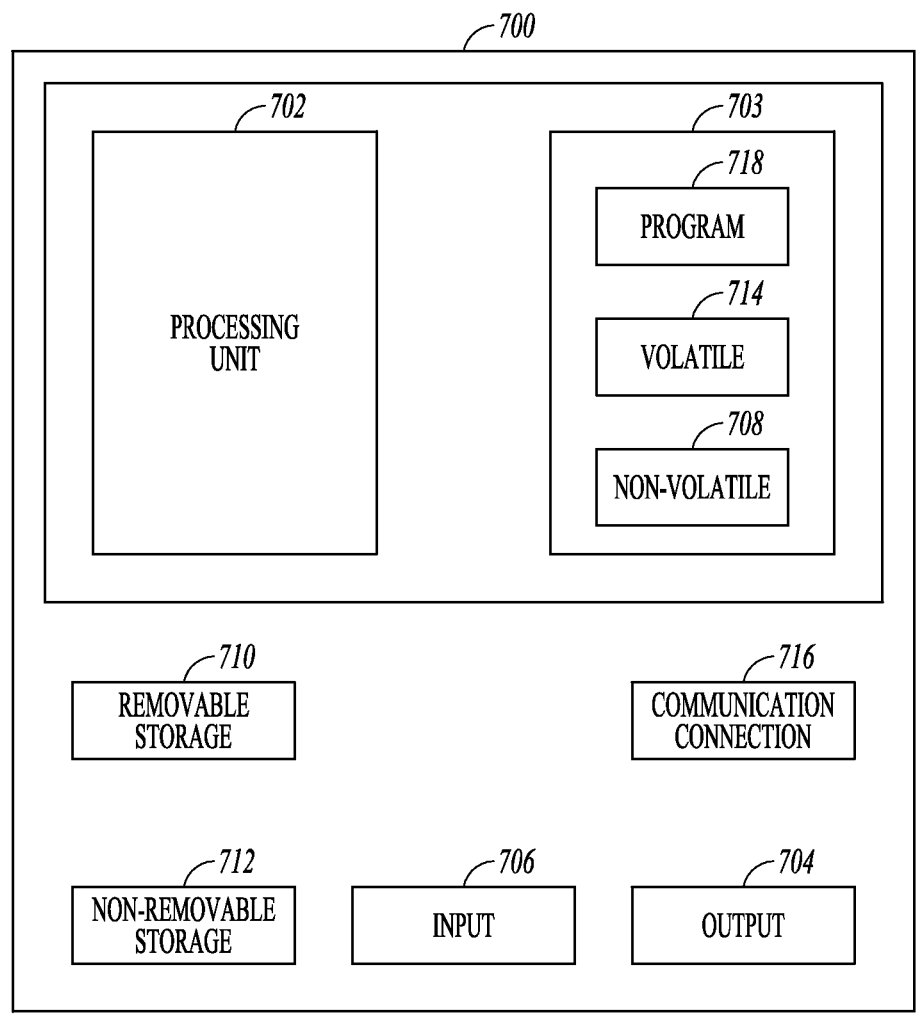
FIG. 7 is a block diagram of circuitry for performing one or more methods according to example embodiments.

FIG. 7 is a block schematic diagram of a computer system 700 to implement methods according to example embodiments. All components need not be used in various embodiments. One example computing device in the form of a computer 700, may include a processing unit 702, memory 703, removable storage 710, and non-removable storage 712. Although the example computing device is illustrated and described as computer 700, the computing device may be in different forms in different embodiments. For example, the computing device may instead be a smartphone, a tablet, smartwatch, or other computing device including the same or similar elements as illustrated and described with regard to FIG. 7. Devices such as smartphones, tablets, and smartwatches are generally collectively referred to as mobile devices. Further, although the various data storage elements are illustrated as part of the computer 700, the storage may also or alternatively include cloud-based storage accessible via a network, such as the Internet.

Memory 703 may include volatile memory 714 and non-volatile memory 708. Computer 700 may include—or have access to a computing environment that includes—a variety of computer-readable media, such as volatile memory 714 and non-volatile memory 708, removable storage 710 and non-removable storage 712. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 700 may include or have access to a computing environment that includes input 706, output 704, and a communication connection 716. Output 704 may include a display device, such as a touchscreen, that also may serve as an input device. The input 706 may include one or more of a touchscreen, touchpad, mouse, keyboard, camera, one or more device-specific buttons, one or more sensors integrated within or coupled via wired or wireless data connections to the computer 700, and other input devices. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN), cellular, WiFi, Bluetooth, or other networks.

Computer-readable instructions stored on a computer-readable medium are executable by the processing unit 702 of the computer 700. A hard drive, CD-ROM, and RAM are some examples of articles including a non-transitory computer-readable medium such as a storage device. The terms computer-readable medium and storage device do not include carrier waves. For example, a computer program 718 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 700 to provide generic access controls in a COM based computer network system having multiple users and servers.

Examples

1. A method comprising:
receiving noise spectral information from a scale;
analyzing the noise spectral information via circuitry to identify instances of noise with various magnitudes at multiple frequencies;
ending a listening period; and
providing the identified instances of noise to be displayed.

2. The method of example 1 wherein the listening period comprises a fixed amount of time.

3. The method of example 2 wherein the fixed period of time is between 5 and 15 seconds.

4. The method of any of examples 1-3 wherein the listening period is a function of new noise sources being identified within a limited period of time.

5. The method of example 4 wherein the listening period continues if a new noise source is identified within the limited period of time.

6. The method of example 5 wherein a new noise source comprises an instance of noise at a different frequency than previously detected during the listening period.

7. The method of example 6 wherein the limited period of time is between 5 and 15 seconds.

8. The method of any of examples 4-7 and further comprising adjusting noise filter parameters based on the identified instances of noise.

9. The method of any of examples 1-8 and further comprising displaying the identified instances of noise sources on a display in real time.

10. A device comprising:
a display;
a communication connection to couple to a scale and receive scale spectrum information;
a memory containing programming and coupled to the communication connection;
circuitry coupled to the communication connection to receive the scale spectrum information and process the spectrum information to create a graph representative of the scale spectrum information; and
a display coupled to the circuitry to provide a display of the graph.

11. The device of example 10 and further comprising an adjustable noise filter.

12. The device of any of examples 10-11 wherein the listening period is a function of new noise sources being identified within a limited period of time.

13. The device of example 12 wherein the listening period continues if a new noise source is identified within the limited period of time.

14. The device of example 13 wherein a new noise source comprises an instance of noise at a different frequency than previously detected during the listening period and wherein the circuitry logs the new noise sources identified within the listening period.

15. A device comprising:
a processor;
a display coupled to the processor;
a communication module coupled to the processor; and
a memory device coupled to the processor and having a program stored thereon for execution by the processor to:
receive noise spectral information from a scale via the communication module;
analyze the noise spectral information to identify instances of noise with various magnitudes at multiple frequencies;
end a listening period; and
provide the identified instances of noise to be displayed on the display.

16. The device of example 15 wherein the listening period comprises a fixed amount of time.

17. The device of any of examples 15-16 wherein the listening period is a function of new noise sources being identified within a limited period of time.

18. The device of example 17 wherein the listening period continues if a new noise source is identified within the limited period of time.

19. The device of example 18 wherein a new noise source comprises an instance of noise at a different frequency than previously detected during the listening period and further comprising logging the new noise sources identified within the listening period.

20. The device of any of examples 15-19 wherein the identified instances of noise sources are displayed on the display in real time.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
receiving vibration noise spectral information from a scale;
analyzing the noise spectral information via circuitry to identify instances of noise with various magnitudes at multiple frequencies;
ending a listening period;
adjusting noise filter parameters based on the identified instances of vibration noise; and
providing the identified instances of noise to be displayed.

2. The method of claim 1 wherein the listening period comprises a fixed amount of time.

3. The method of claim 2 wherein the fixed period of time is between 5 and 15 seconds.

4. The method of claim 1 wherein the listening period is a function of new vibration noise sources being identified within a limited period of time.

5. The method of claim 4 wherein the listening period continues if a new vibration noise source is identified within the limited period of time.

6. The method of claim 5 wherein the new vibration noise source comprises an instance of noise at a different frequency than previously detected during the listening period.

7. The method of claim 6 wherein the limited period of time is between 5 and 15 seconds.

8. The method of claim 1 and further comprising displaying the identified instances of vibration noise sources on a display in real time.

9. A device comprising:
a display;
a communication connection to couple to a scale and receive scale vibration spectrum information;
a memory containing programming and coupled to the communication connection;

circuitry coupled to the communication connection to receive the scale vibration spectrum information and process the spectrum information by sweeping through a specified frequency range and successively detecting signal power at each of a plurality of frequency bands within the frequency range to create a graph representative of the scale vibration spectrum information;

the display coupled to the circuitry to provide a display of the graph; and an adjustable noise filter, wherein the circuitry is coupled to the adjustable noise filter to adjust filter parameters of the adjustable noise filter responsive to the detected signal power at each of the plurality of frequency bands and lock the adjusted filter parameters into a nonvolatile portion of the memory.

10. The device of claim 9 wherein a length of listening period is a function of new vibration noise sources being identified within a limited period of time.

11. The device of claim 10 wherein the listening period continues if the vibration new noise source is identified within the limited period of time.

12. The device of claim 11 wherein the new vibration noise source comprises an instance of vibration noise at a different frequency than previously detected during the listening period and wherein the circuitry logs the new vibration noise sources identified within the listening period.

13. A device comprising:
a processor;
a display coupled to the processor;
a communication module coupled to the processor;
an adjustable noise filter; and
a memory device coupled to the processor and having a program stored thereon for execution by the processor to:

receive vibration noise spectral information from a scale via the communication module;

analyze the vibration noise spectral information to identify instances of vibration noise with various magnitudes at multiple frequencies to generate detected signal power at each of a plurality of frequency bands;

end a listening period;

provide the identified instances of vibration noise to be displayed on the display; and wherein the processor is coupled to the adjustable noise filter to adjust filter parameters of the adjustable noise filter responsive to the detected signal power at each of the plurality of frequency bands and lock the adjusted filter parameters into a nonvolatile portion of the memory device.

14. The device of claim 13 wherein the listening period comprises a fixed amount of time.

15. The device of claim 13 wherein the listening period is a function of new vibration noise sources being identified within a limited period of time.

16. The device of claim 15 wherein the listening period continues if the new vibration noise source is identified within the limited period of time.

17. The device of claim 16 wherein a new noise source comprises an instance of vibration noise at a different frequency than previously detected during the listening period and further comprising logging the new vibration noise sources identified within the listening period.

18. The device of claim 13 wherein the identified instances of vibration noise sources are displayed on the display in real time.

* * * * *